United States Patent
Das et al.

(10) Patent No.: US 7,853,281 B2
(45) Date of Patent: Dec. 14, 2010

(54) METHODS AND APPARATUS FOR TRACKING WIRELESS TERMINAL POWER INFORMATION

(75) Inventors: Arnab Das, Summit, NJ (US); Sundeep Rangan, Jersey City, NJ (US); Samel Celebi, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 934 days.

(21) Appl. No.: 11/487,262

(22) Filed: Jul. 14, 2006

(65) Prior Publication Data

US 2007/0243894 A1    Oct. 18, 2007

Related U.S. Application Data

(60) Provisional application No. 60/792,253, filed on Apr. 14, 2006.

(51) Int. Cl.
*H04B 7/00* (2006.01)
(52) U.S. Cl. .............. 455/522; 455/67.11; 455/68; 455/69
(58) Field of Classification Search ............ 455/522, 455/67.11, 68–70, 115.3, 126, 127.1, 127.2, 455/135, 226.3, 277.2, 296; 370/318, 335, 370/342
See application file for complete search history.

(56) References Cited

U.S. PATENT DOCUMENTS

| | | | |
|---|---|---|---|
| 5,842,113 A * | 11/1998 | Nanda et al. | 455/69 |
| 6,452,914 B2 * | 9/2002 | Niemela | 370/337 |
| 6,487,188 B1 * | 11/2002 | Kitade et al. | 370/337 |
| 6,917,607 B1 * | 7/2005 | Yeom et al. | 370/342 |
| 7,542,769 B1 * | 6/2009 | Chheda et al. | 455/453 |
| 2003/0087605 A1 * | 5/2003 | Das et al. | 455/67.1 |
| 2004/0120334 A1 * | 6/2004 | Nation | 370/412 |
| 2004/0166884 A1 | 8/2004 | Oh et al. | |
| 2004/0208181 A1 * | 10/2004 | Clayton et al. | 370/395.4 |
| 2005/0047393 A1 * | 3/2005 | Liu | 370/352 |
| 2007/0117583 A1 * | 5/2007 | Haim | 455/522 |
| 2007/0147289 A1 * | 6/2007 | Nibe | 370/329 |
| 2007/0242736 A1 * | 10/2007 | Proctor et al. | 375/219 |
| 2008/0037450 A1 * | 2/2008 | Itoh et al. | 370/278 |

FOREIGN PATENT DOCUMENTS

| | | |
|---|---|---|
| WO | WO00/31893 | 6/2000 |
| WO | WO2004/102827 | 11/2004 |

* cited by examiner

*Primary Examiner*—Dominic E Rego
(74) *Attorney, Agent, or Firm*—Donald C. Kordich

(57) ABSTRACT

Power control reports are communicated less frequently than the power control commands. The base station tracks the commands sent to the wireless terminal and estimates the wireless terminal's control channel transmit power. Received power control channel reports are utilized to compare the base station's estimated wireless terminal control channel transmit power to the actual wireless terminal control channel transmit power. An estimate of the error rate of transmitted power control signals is generated based using the tracked power command information and received power report information. Adjustments are performed in the power control command signaling to compensate for estimated error rates.

54 Claims, 10 Drawing Sheets

1100

| Format of ULTxBKF5 | |
|---|---|
| Bits (MSb:LSb) | Reported wtDLPICHSNR |
| 0b00000 | 6.5 dB |
| 0b00001 | 7 dB |
| 0b00010 | 8 dB |
| 0b00011 | 9 dB |
| 0b00100 | 10 dB |
| 0b00101 | 11 dB |
| 0b00110 | 12 dB |
| 0b00111 | 13 dB |
| 0b01000 | 14 dB |
| 0b01001 | 15 dB |
| 0b01010 | 16 dB |
| 0b01011 | 17 dB |
| 0b01100 | 18 dB |
| 0b01101 | 19 dB |
| 0b01110 | 20 dB |
| 0b01111 | 21 dB |
| 0b10000 | 22 dB |
| 0b10001 | 23 dB |
| 0b10010 | 24 dB |
| 0b10011 | 25 dB |
| 0b10100 | 26 dB |
| 0b10101 | 27 dB |
| 0b10110 | 28 dB |
| 0b10111 | 29 dB |
| 0b11000 | 30 dB |
| 0b11001 | 32 dB |
| 0b11010 | 34 dB |
| 0b11011 | 36 dB |
| 0b11100 | 38 dB |
| 0b11101 | 40 dB |
| 0b11110 | Reserved |
| 0b11111 | Reserved |

| Format of ULTxBKF4: | |
|---|---|
| Bits (MSb:LSb) | Reported WT.ULDCCHBackoff |
| 0b0000 | 6 dB |
| 0b0001 | 7 dB |
| 0b0010 | 8 dB |
| 0b0011 | 9 dB |
| 0b0100 | 10 dB |
| 0b0101 | 11 dB |
| 0b0110 | 12 dB |
| 0b0111 | 13 dB |
| 0b1000 | 14 dB |
| 0b1001 | 16 dB |
| 0b1010 | 18 dB |
| 0b1011 | 20 dB |
| 0b1100 | 24 dB |
| 0b1101 | 28 dB |
| 0b1110 | 32 dB |
| 0b1111 | 36 dB |

FIGURE 9

METHODS AND APPARATUS FOR TRACKING WIRELESS TERMINAL POWER INFORMATION

RELATED APPLICATIONS

The present application claims the benefit of U.S. Provisional Patent Application Ser. No. 60/792,253, filed on Apr. 14, 2006, titled "METHODS AND APPARATUS FOR TRACKING WIRELESS TERMINAL POWER INFORMATION", which is hereby expressly incorporated by reference.

FIELD OF THE INVENTION

The present invention relates to wireless communications systems and, more specifically, to methods and apparatus by which a base station tracks wireless terminal transmission power related information.

BACKGROUND

A base station which is closed loop power controlling a wireless terminal's transmitter to achieve a target received power at base station will typically issue power control commands at a high rate while reporting of transmission power information from the wireless terminal is typically at a much lower rate. This infrequent reporting of transmission power information from the wireless terminal can lead to the base station overestimating or underestimating the available power at the wireless terminal for data transmission. Poor estimates of the available power information can lead to inefficient rates of data transmission by the wireless terminal.

In view of the above, there is a need for additional methods and apparatus that improve the base station's estimate of the power available at the wireless terminal for data transmission. Methods and apparatus that provide a tracking capability between a base station's understanding of sent power commands and a wireless terminal's understanding of received and acted upon power control commands would be useful. Methods and apparatus that also allow for modeling, estimation, and/or command correction compensations to achieve a better level of wireless terminal transmission power control would also be beneficial.

SUMMARY

A base station transmits power control commands, e.g., increment/decrement commands, to a wireless terminal to command adjustments to the transmission power of a control channel of the wireless terminal. These commands are issued by the base station in order to control the received power level of the control channel at the base station. Some of the power control commands are received, successfully recovered, and implemented by the wireless terminal. However some of the transmitted power control commands may not be received, while other received signals may be incorrectly interpreted by the wireless terminal, e.g., due to additional noise corrupting the signal. In addition, channel conditions between the wireless terminal and base station may be changing, e.g., especially in the case where the wireless terminal is a mobile node. The wireless terminal communicates transmission power reports to the base station indicative of the transmission power of the control channel at a point in time, e.g., referenced to the start of the communications segment conveying the report. The transmission power reports are communicated less frequently than the power control commands. The base station tracks the commands sent to the wireless terminal and estimates the wireless terminal's control channel transmit power between consecutive wireless terminal transmission power reports. Received transmission power reports are utilized to compare the base station's estimated wireless terminal control channel transmit power to the actual wireless terminal control channel transmit power.

An estimate of the error rate of transmitted power control signals is generated using the tracked power command information and received transmission power information. Adjustments are then made to the base station's estimated wireless terminal control channel transmission power and/or power control command signaling to compensate for estimated error rates.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE DRAWINGS

FIG. 8 is a drawing of an exemplary format for an exemplary 5 bit wireless terminal transmission power backoff report.

FIG. 9 is a drawing of an exemplary format for an exemplary 4 bit wireless terminal transmission power backoff report.

DETAILED DESCRIPTION

Figure 1:
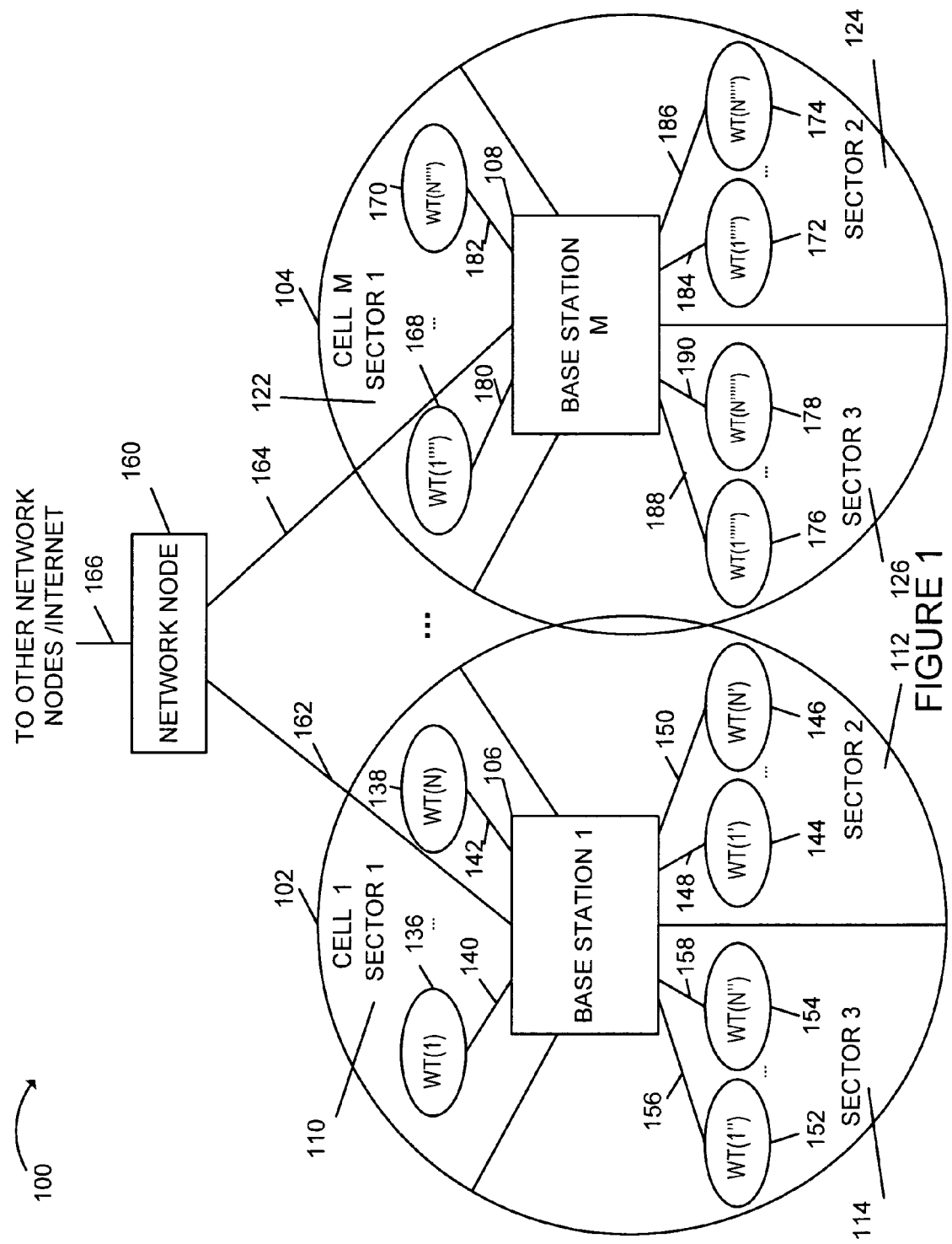
FIG. 1 is a drawing of an exemplary communication system implemented in accordance with various embodiments.

FIG. 1 shows an exemplary communication system 100 implemented in accordance with various embodiments. Exemplary communications system 100 includes multiple cells: cell 1 102, cell M 104. Exemplary system 100 is, e.g., an exemplary multiple access orthogonal frequency division multiplexing (OFDM) wireless communications system such as a multiple access OFDM spread spectrum system including tone hopping. Each cell 102, 104 of exemplary system 100 includes three sectors. Cells which have not be subdivided into multiple sectors (N=1), cells with two sectors (N=2) and cells with more than 3 sectors (N>3) are also possible in accordance with various embodiments. Each sector supports one or more carriers and/or downlink tones blocks. Each downlink tone block has a corresponding uplink tone block. In some embodiments at least some of the sectors support three downlink/uplink tones block pairs. Each combination of a sector and tone block pair, for a base station, corresponds to a different base station sector attachment point. Cell 1 102 includes a first sector, sector 1 110, a second sector, sector 2 112, and a third sector, sector 3 114. Similarly, cell M 104 includes a first sector, sector 1 122, a second sector, sector 2 124, and a third sector, sector 3 126. Cell 1 102 includes a base station (BS), base station 1 106, and a plurality of wireless terminals (WTs) in each sector 110, 112, 114. Sector 1 110 includes WT(1) 136 and WT(N) 138 coupled to BS 1 106 via wireless links 140, 142, respectively; sector 2 112 includes WT(1') 144 and WT(N') 146 coupled to BS 1 106 via wireless links 148, 150, respectively; sector 3 114 includes WT(1") 152 and WT(N") 154 coupled to BS 1 106 via wireless links 156, 158, respectively. Similarly, cell M 104 includes base station M 108, and a plurality of wireless terminals (WTs) in each sector 122, 124, 126. Sector 1 122 includes WT(1''') 168 and WT(N''') 170 coupled to BS M 108 via wireless links 180, 182, respectively; sector 2 124 includes WT('''') 172 and WT(N'''') 174 coupled to BS M 108 via wireless links 184, 186, respectively; sector 3 126 includes WT(''''') 176 and WT(N''''') 178 coupled to BS M 108 via wireless links 188, 190, respectively.

System 100 also includes a network node 160 which is coupled to BS1 106 and BS M 108 via network links 162, 164, respectively. Network node 160 is also coupled to other network nodes, e.g., other base stations, AAA server nodes, intermediate nodes, routers, etc. and the Internet via network link 166. Network links 162, 164, 166 may be, e.g., fiber optic cables. Each wireless terminal, e.g. WT 1 136, includes a transmitter as well as a receiver. At least some of the wireless terminals, e.g., WT(1) 136, are mobile nodes which may move through system 100 and may communicate via wireless links with the base station in the cell in which the WT is currently located, e.g., using a base station sector attachment point. The wireless terminals (WTs), e.g. WT(1) 136, may communicate with peer nodes, e.g., other WTs in system 100 or outside system 100 via a base station, e.g. BS 106, and/or network node 160. WTs, e.g., WT(1) 136 may be mobile communications devices such as cell phones, personal data assistants with wireless modems, laptop computers with wireless modems, data terminals with wireless modems, etc.

Figure 2:
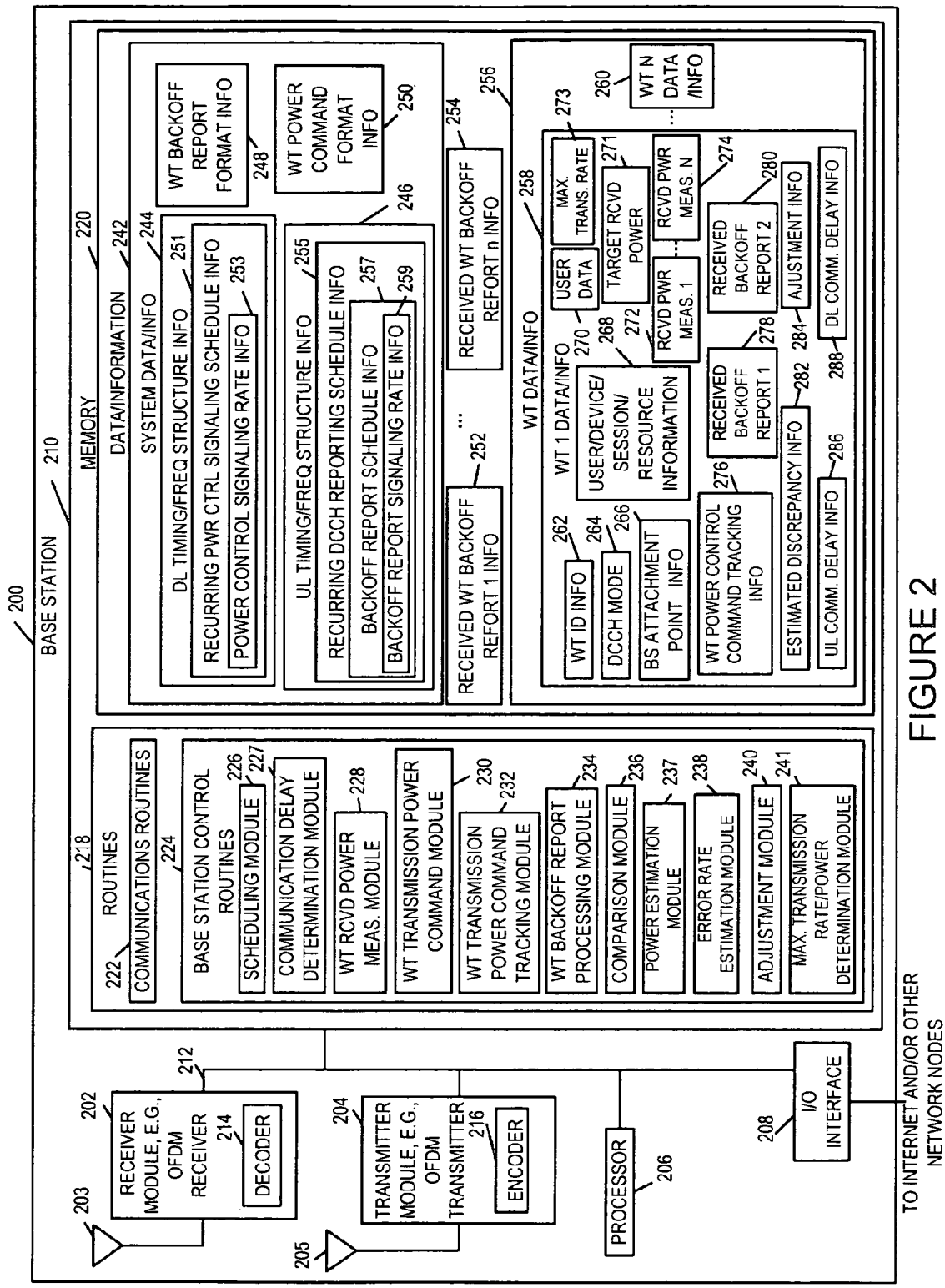
FIG. 2 is a drawing of an exemplary base station, e.g., access node, implemented in accordance with various embodiments.

FIG. 2 is a drawing of an exemplary base station 200 implemented in accordance with various embodiments. Exemplary base station 200 may be any of the base stations (106, 108) of the exemplary system 100 of FIG. 1. Exemplary base station 200 includes a receiver module 202, a transmitter module 204, a processor 206, an I/O interface 208, and memory 210 coupled together via bus 212 over which the various elements may interchange data and information. Memory 210 includes routines 218 and data/information 220. The processor 206, e.g., a CPU, executes the routines 218 and uses the data/information 220 in memory 210 to control the operation of the base station 200 and implement methods.

Receiver module 202, e.g., an OFDM receiver, is coupled to receive antenna 203 via which the base station 200 receives uplink signals from wireless terminals. The received uplink signals include user data signals and dedicated control channel signals conveying a plurality of different types of uplink information reports. One of the plurality of different types of uplink reports is a wireless terminal transmission power backoff report. Receiver module 202 receives power information from a wireless terminal indicative of an amount of power dedicated for use in transmitting a predetermined set of signals to the base station 200. Receiver module 202 includes a decoder 214 which decodes at least some of the received uplink signals which had been encoded by a wireless terminal prior to transmission.

Transmitter module 204, e.g., an OFDM transmitter, is coupled to transmit antenna 205 via which the base station 200 transmits downlink signals to wireless terminals. The downlink signals include beacon signals, pilot signals, user data signals, and various control signals. The control signals include command signals directed to individual wireless terminal to change a wireless terminal's transmission power level, e.g., the command signals being used as part of a closed loop power control implementation. Transmitter module 204 transmits power control signals to a wireless terminal over a period of time via a wireless communications link.

Figure 4:
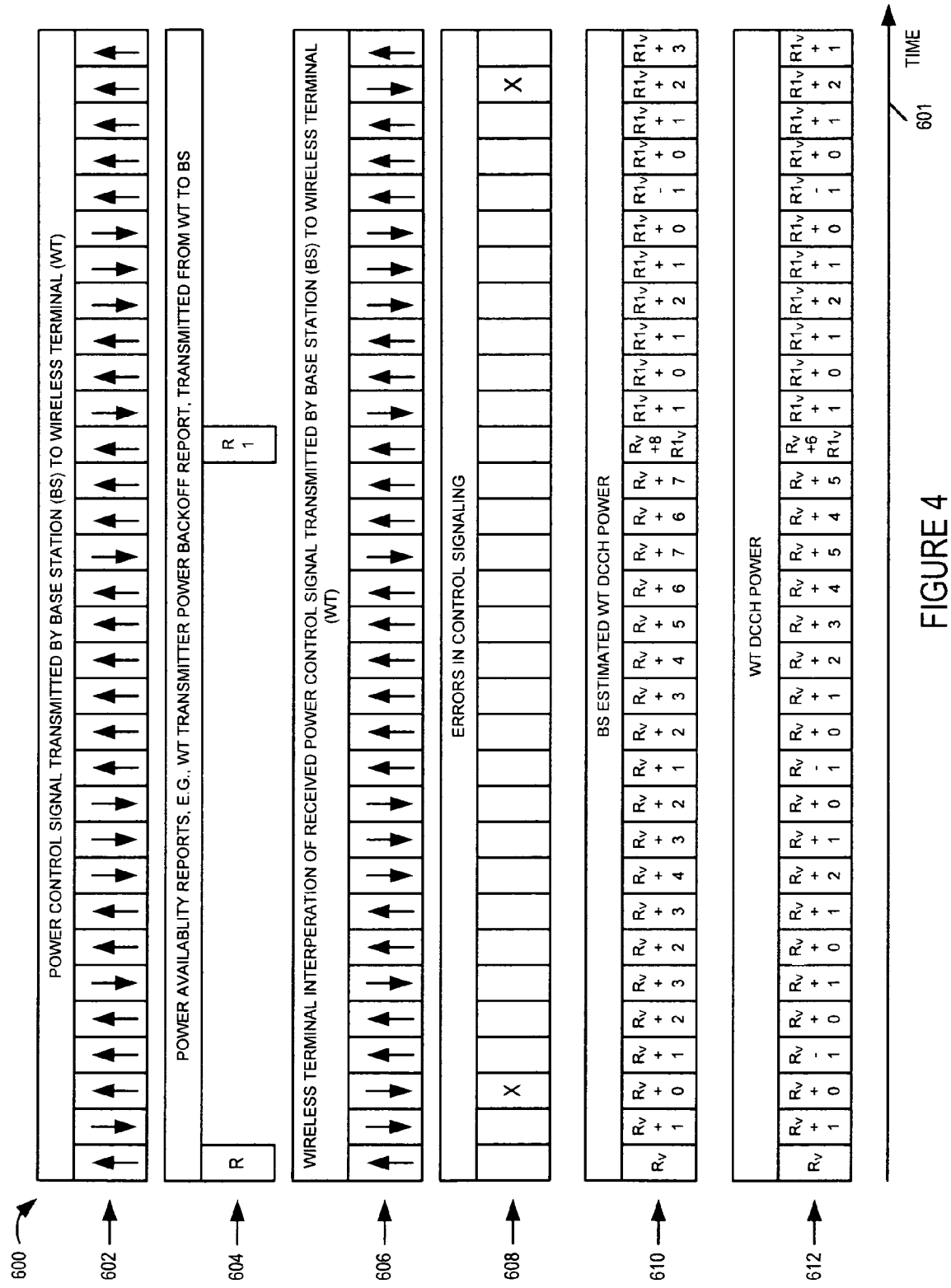
FIG. 4 is a drawing set illustrating exemplary signaling and wireless terminal power tracking in accordance with various embodiments.
Figure 10:
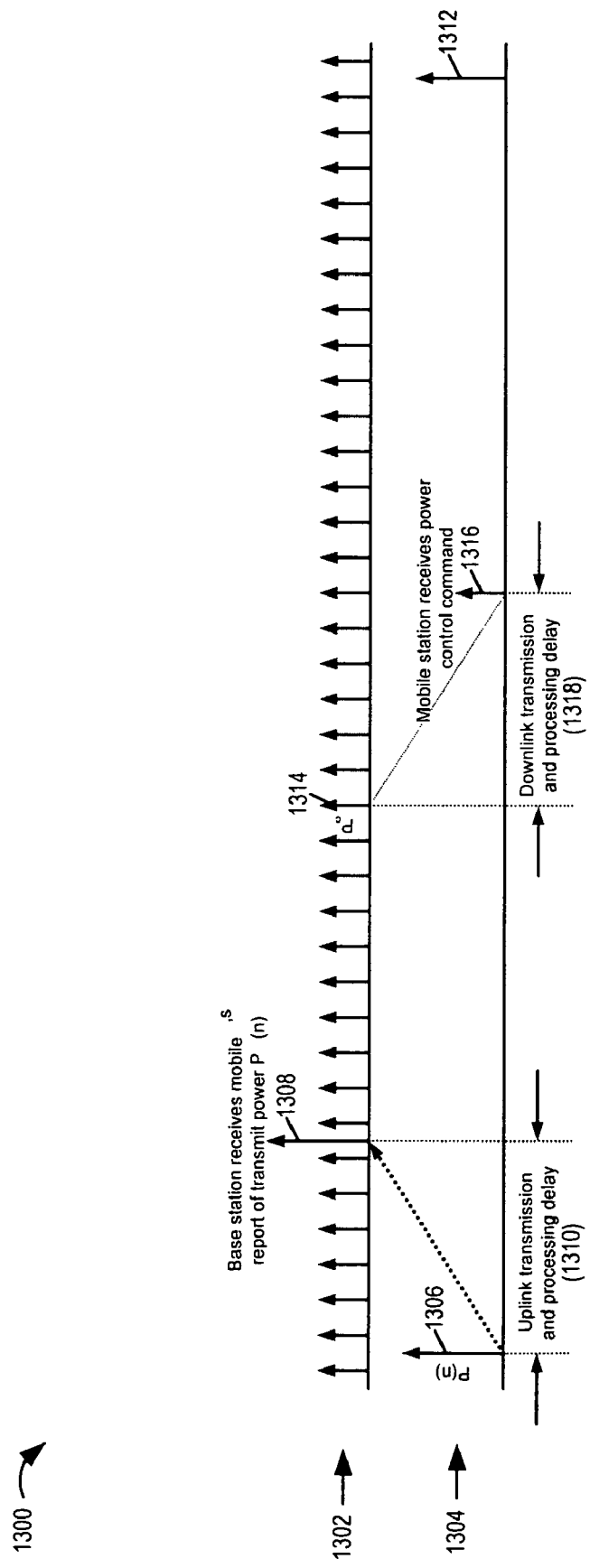
FIG. 10 is a drawing illustrating exemplary power control signaling between a base station and a wireless terminal in accordance with various embodiments and illustrates features of some embodiments.

In various embodiments, for a given wireless terminal using a base station 200 attachment point, the base station receives power information signals, e.g., dedicated control channel transmission power backoff reports, at a first rate and transmits power control signals at a second rate which is faster than the first rate. In some such embodiments, the second rate is at least 20 times the first rate. FIG. 4 and FIG. 10 illustrate two examples of transmission power information being reported from a wireless terminal to a base station at a slower rate than command control signals are sent from the base station to the wireless terminal.

I/O interface 208 couples the base station 200 to the Internet and/or other network nodes, e.g., other base stations, routers, AAA nodes, home agent nodes, etc. Thus I/O interface 208, by coupling base station 200 to a backhaul network coupled to other base stations allows a wireless terminal using a network attachment point of base station 200 to participate in communications session with a peer node, e.g., another wireless terminal, using a different base station to attach to the network.

Routines 218 include communications routines 222 and base station control routines 224. Communications routines 222 implement the various communications protocols used by base station 200. Base station control routines 224 include a scheduling module 226, a communication delay determination module 227, a wireless terminal received power measurement module 228, a wireless terminal transmission power command module 230, a wireless terminal power command tracking module 232, a wireless terminal backoff report processing module 234, a comparison module 236, a power estimation module 237, an error rate estimation module 238, an adjustment module 240, an a maximum transmission rate determination module 241. Scheduling module 226, e.g., a scheduler, schedules upland and downlink air link resources for wireless terminals.

Wireless terminal received power measurement module 228 measures the received power of the dedicated control channel signals from wireless terminals using a base station 200 attachment point, e.g., obtaining a plurality of received power measurements for each of the wireless terminals being closed loop power controlled by the base station 200. Received power measurement 1 272, . . . , received power measurement N 274 represent measurements of wireless terminal received power measurement module 228 associated with wireless terminal 1.

Wireless terminal transmission power command module 230 generates transmission power commands to be transmitted to wireless terminals being power controlled by base station 200, e.g., a command instructing the individual wireless terminal to which the command is directed to increment or decrement a transmission power level of its uplink dedicated control channel signaling. In various embodiments, acknowledgment signals are not used in response to wireless terminal transmission power command signaling, e.g., to reduce overhead and/or due to round trip time considerations. Wireless terminal transmission power command module 230 determines the power control signal to be transmitted at a particular point in time as a function of a quality measurement of a received signal and a desired received signal quality level. The measurement of the received signal is, in some embodiments, performed by wireless terminal received power measurement module 228.

Wireless terminal power command tracking module 232 tracks the power commands generated and sent to a wireless terminal for wireless terminals. For example, in some embodiments, the wireless terminal power command tracking module 232, for a wireless terminal being power controlled, stores information regarding the power commands sent to the wireless terminal and/or cumulative information of the power command signaling. Wireless terminal power command tracking module 232, in some embodiments, sums up the commands and/or tracks commands, and/or the tracks the expected result of commands being sent over time intervals, e.g., corresponding to a time between successive wireless terminal transmission power backoff reports.

Wireless terminal backoff report processing module 234 processes received wireless terminal transmission power backoff reports, e.g., processing signals of a received dedicated control channel segment, to obtain the information bit values of a transmission power backoff report and recover the information, e.g., power level information being communicated. In some embodiments, in different modes of operation, the wireless terminal transmission power backoff report uses a different format. For example, in one exemplary embodiment, in a full-tone format DCCH mode of operation the wireless terminal transmission power backoff report is a 5 bit report while in a split-tone format DCCH mode of operation the wireless terminal transmission power backoff report is a 4 bit report. In various embodiments, the power information communicated via the backoff report is referenced to a point in time prior to the start of transmission of the dedicated control channel segment conveying the report, e.g., by a predetermined offset.

Comparison module 236 uses information obtained from one or more received wireless terminal backoff reports and the wireless terminal power command tracking module 232 to compare actual wireless terminal power control operations with expected wireless terminal power control operations based upon base station commanded wireless terminal power control signaling to perform wireless terminal power control operations. The discrepancy between base station commands and wireless terminal implemented commands can be due to any of a number of reasons including: failure to receive a transmitted command signal, failure to successfully recover a commanded signal, an intentional decision by the wireless terminal to disregard a command, and/or an intentional decision by a wireless terminal to modify a received command.

Power estimation module 237 estimates the amount of power dedicated by a wireless terminal during a period of time for transmitting a predetermined set of signals. In some embodiments, the estimating of module 237 is performed using the received power information, e.g., from one or more received transmission power backoff reports, and information indicating changes in the dedicated transmission power specified by transmitted control signals, e.g., the transmitted power control signals directed to the wireless terminal. In some embodiments, the received power information indicates an amount of power dedicated for transmitting a predetermined set of signals during a single transmission time period. In some such embodiments, the predetermined set of signals are dedicated control channel signals. In various embodiments, the power estimation module 237 estimates the amount of power dedicated by a wireless terminal during a period of time for transmitting a predetermined set of signals using at least one of an uplink communications delay and a downlink communications delay. In some such embodiments, the uplink communications delay includes an uplink transmission delay and a downlink transmission delay and the downlink communications delay includes a downlink transmission delay and a downlink signal processing delay. FIG. 10 provides an example of estimation as a function of uplink and downlink communication delay.

Error rate estimation module 238 uses information from the comparison module 236 to estimate error rates, e.g., error rates associated with failure to implement a command. In some embodiments, the error rate estimation module 238 estimates a probability associated with the likelihood that a power control command sent to a wireless terminal will be received, successfully recovered, and/or properly implemented. In some embodiments, error rate estimation module 238 generates an estimate of a power adjustment signal error rate.

Comparison module 236 and/or error rate estimation module 238 generate and/or use estimated discrepancy information 282.

Adjustment module 240 uses the estimated discrepancy information to adjust subsequent wireless terminal power command tracking and/or subsequent power control command signaling. For example the adjustment module 240, in some embodiments, generates adjustment information 284, such as, e.g., scale factor adjustment parameters and/or weighting parameters, to be utilized by the wireless terminal transmission power command module 230 and/or the wireless terminal power command tracking module 232. Adjustment module 240, in some embodiments, modifies an estimated amount of power as a function of an estimated error rate determined by module 238.

Maximum transmission rate determination module 241 determines, for a given wireless terminal, based on the estimated amount of power dedicated to said predetermined set of signals, at least one of a maximum transmission rate to be used by said wireless terminal for at least some uplink traffic and/or a maximum power to be used by said wireless terminal for at least some uplink traffic. In some embodiments, the maximum transmission rate determination module 241 determines the amount of power available at a wireless terminal for uplink transmissions after an estimated amount of power is removed from a maximum available uplink power amount.

Data/information 220 includes system data/information 242, a plurality of sets of received wireless terminal backoff report information (received wireless terminal backoff report 1 information 252, . . . , received wireless terminal backoff report n information 254), and wireless terminal data/information 256. System data/information 242 includes downlink timing/frequency structure information 244, uplink timing/frequency structure information 246, wireless terminal backoff report format information 248, and wireless terminal power command format information 250.

Wireless terminal data/information 256 includes a plurality of sets of wireless terminal data/information (wireless terminal 1 data/information 258, . . . , wireless terminal N data/information 260. Wireless terminal 1 data/information 258 includes wireless terminal identification information 262, dedicated control channel mode information 264, base station attachment point information 266, user/device/session/resource information 268, user data 270, maximum transmission rate information 273, target received power information 271, a plurality of received power measurements (received power measurement 1 272, . . . , received power measurement N 274), wireless terminal power control command tracking information 276, received wireless terminal transmission power backoff report 1 278, received wireless terminal transmission power backoff report 2 280, estimated discrepancy information 282, adjustment information 284, uplink communications delay information 286 and downlink communications delay information 288.

Figure 6:
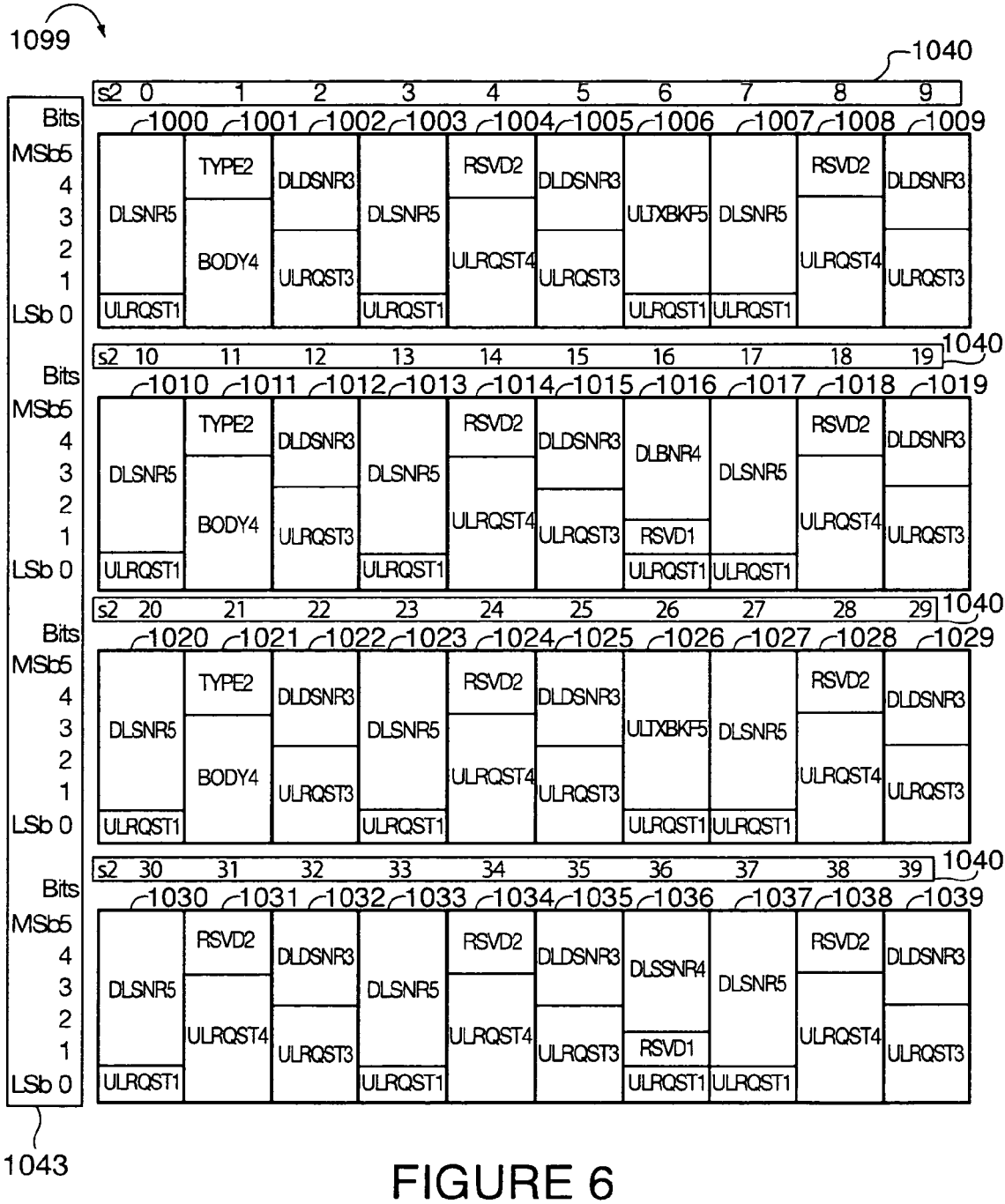
FIG. 6 is a drawing of an exemplary recurring structure used in an exemplary full-tone format dedicated control channel mode of operation.

Downlink timing/frequency structure information 244 includes downlink channel structure including information identifying segments used to convey wireless terminal transmission power commands to individual wireless terminals, downlink carrier frequency information, downlink tone block information, downlink OFDM timing information, information relating to grouping of OFDM transmission time intervals, and downlink tone hopping information. Downlink timing/frequency structure information 244 including recurring power control signaling schedule information 251. The recurring power control signaling schedule information 251 includes power control signaling rate information 253. Uplink timing/frequency structure information 246 includes uplink channel structure including information identifying dedicated control channel segments used to convey wireless terminal transmission power backoff reports, uplink carrier frequency information, uplink tone block information, uplink OFDM timing information, information relating to grouping of OFDM transmission time intervals, and uplink tone hopping information. Uplink timing/frequency structure information 246 includes recurring DCCH reporting schedule information 255. The recurring DCCH reporting schedule information 255 includes backoff report schedule information 257. The backoff report schedule information includes backoff report signaling rate information 259. Table 1099 of FIG. 6 is an example of recurring DCCH report schedule information for a beaconslot for a full tone format mode of dedicated control channel operation which identifies positions within the recurring schedule where 5 bit uplink transmission power backoff reports (ULTXBKF5) are scheduled. The exemplary recurring DCCH schedule of table 1099 of FIG. 6 includes 40 indexed segments (1000, 1001, 1002, 1003, 1004, 1005, 1006, 1007, 1008, 1009, 1010, 1011, 1012, 1013, 1014, 1015, 1016, 1017, 1018, 1019, 1020, 1021, 1022, 1023, 1024, 1025, 1026, 1027, 1028, 1029, 1030, 1031, 1032, 1033, 1034, 1035, 1036, 1037, 1038, 1039). The index value (ranging from 0 . . . 39) of a dedicated control channel segment in the recurring structure of table 1099 is indicated by the value of s2 in block 1040 listed above the segment. A dedicated control channel segment in the exemplary full tone format mode of table 1099 conveys 6 information bits as indicated by block 1043. Various different reports are communicated by the dedicated control channel segments including SNR reports (DLSNR5, DLDSNR3), uplink traffic request reports (ULRQST1, ULRQST3, ULRQST4), beacon ratio reports (DLBNR4), noise reports (DLSSNR4) and uplink transmission power backoff reports (ULTXBKF5). A 5 bit uplink transmission power backoff report (ULTXBKF5) is communicated in each of segments 1006 and 1026 using the 5 most significant bits of these segments. Table 3299 of FIG. 7 is an example of recurring DCCH report schedule information for a beaconslot for a split tone format mode of dedicated control channel operation which identifies positions within the recurring schedule where 4 bit uplink transmission power backoff reports (ULTXBKF4) are scheduled.

Figure 7:
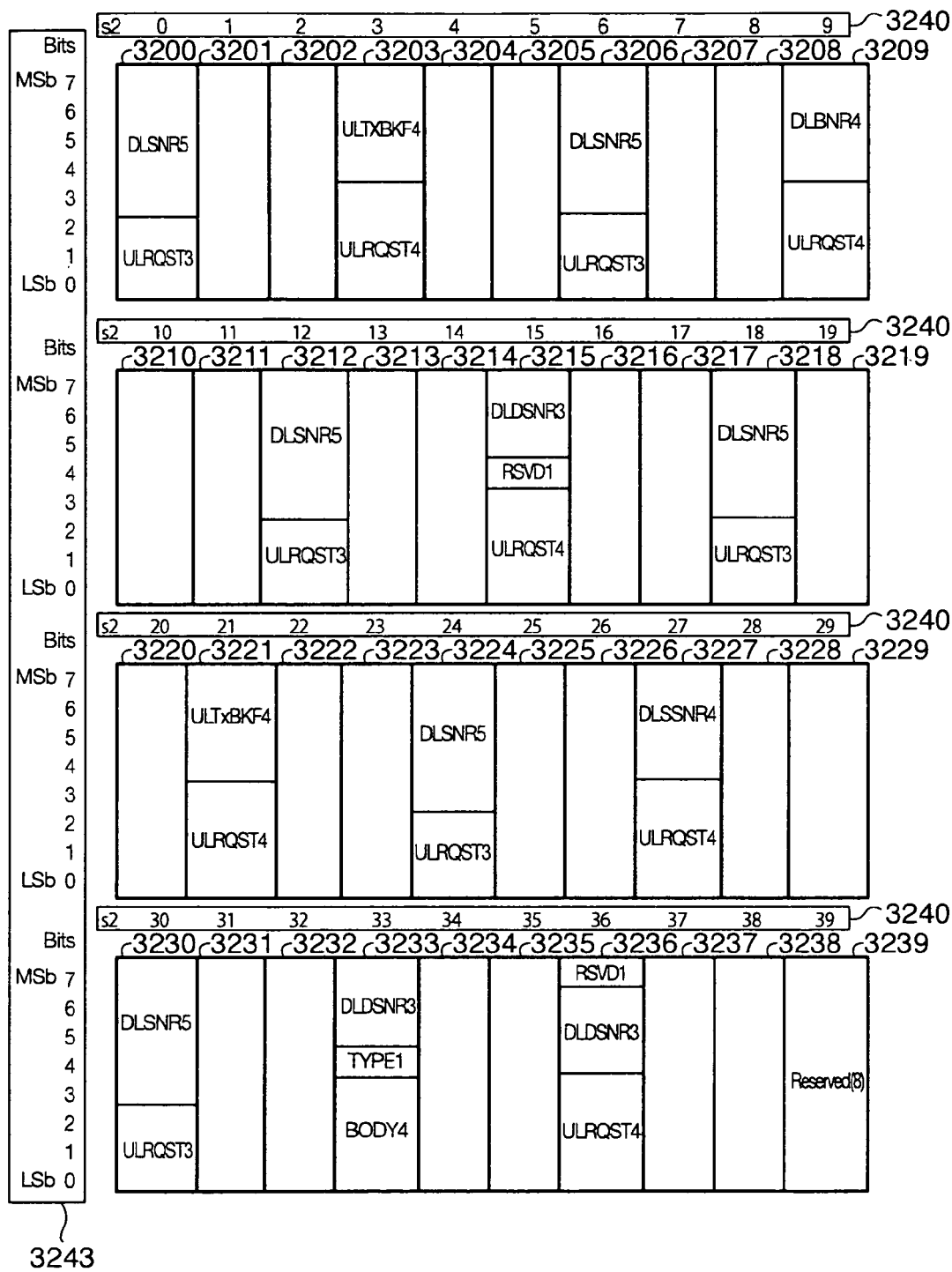
FIG. 7 is a drawing of an exemplary recurring structure used in an exemplary split-tone format dedicated control channel mode of operation.

The exemplary recurring DCCH schedule of table 3299 of FIG. 7 includes 40 indexed segments (3200, 3201, 3202, 3203, 3204, 3205, 3206, 3207, 3208, 3209, 3210, 3211, 3212, 3213, 3214, 3215, 3216, 3217, 3218, 3219, 3220, 3221, 3222, 3223, 3224, 3225, 3226, 3227, 3228, 3229, 3230, 3231, 3232, 3233, 3234, 3235, 3236, 3237, 3238, 3239). The index value (ranging from 0 . . . 39) of a dedicated control channel segment in the recurring structure of table 3299 is indicated by the value of s2 in block 3240 listed above the segment. A dedicated control channel segment in the exemplary split tone format mode of table 3299 conveys 8 information bits as indicated by block 3243. Various different reports are communicated by the dedicated control channel segments including SNR reports (DLSNR5, DLDSNR3), uplink traffic request reports (ULRQST3, ULRQST4), beacon ratio reports (DLBNR4), noise reports (DLSSNR4) and uplink transmission power backoff reports (ULTXBKF4). A 4 bit uplink transmission power backoff report (ULTXBKF4) is communicated in each of segments 3203 and 3221 using the 4 most significant bits of these segments. In table 3299, a report schedule for a $1^{st}$ set of dedicated control channel segments (3200, 3203, 3206, 3209, 3212, 3215, 3218, 3221, 3224, 3227, 3230, 3233, 3236) is illustrated. A similar report schedule may apply for a second set of segments (3201, 3204, 3207, 3210, 3213, 3216, 3219, 3222, 3225, 3228, 3231, 3234, 3237) and for a third set of segments (3202, 3205, 3208, 3211, 3214, 3217, 3220, 3223, 3226, 3229, 3232, 3235, 3238). In split tone DCCH format the same logical DCCH tone may be shared by up to three different wireless terminals, each allocated a set of segments in which to communicated uplink dedicated control channel reports including transmission power backoff reports.

Wireless terminal backoff report format information 248 includes information identifying formats used for wireless terminal backoff reports used in a full-tone format DCCH mode of operation and a split-tone format mode of DCCH operation. In one exemplary embodiment, the wireless terminal transmission power backoff report format is a function of the wireless terminal DCCH mode of operation, e.g., a 5 bit report is used for full-tone DCCH mode and a 4 bit report is used for split-tone format DCCH mode. Format information 248 includes information identifying the value, e.g., in dBs, being communicated by each of the potential bit patterns of the 4 bit and 5 bit backoff reports. Table 1100 of FIG. 8 includes wireless terminal backoff report format information for an exemplary 5 bit report, while table 1200 of FIG. 9 includes wireless terminal backoff report format information for an exemplary 4 bit report.

Wireless terminal power command format information 250 includes information mapping the information that can be conveyed by a power control command, e.g., an increment command associated with one bit pattern and a decrement command associated with a different bit pattern. In some embodiment a single bit is used to convey the increment or decrement command. In some embodiments, a power control command to a wireless terminal uses a single OFDM tone-symbol conveying a single modulation symbol, the modulation symbol having the power control command encoded.

Received wireless terminal backoff report 1 information 252, . . . , received wireless terminal backoff report n information 254 includes a plurality of sets of report information including pre-processed and post processed information corresponding to a plurality of received wireless terminal transmission power backoff reports. Some of the reports may be from different wireless terminals and some of the reports may be from the same wireless terminal. For example, in one exemplary embodiment, corresponding to one base station 200 attachment point, the wireless terminals using that attachment point, which are in full-tone format DCCH mode, transmit a transmission power backoff report using a first format, e.g., a 5 bit format, using preselected DCCH segments in a recurring transmission timing pattern being followed for the DCCH full-tone format. Similarly, in the one exemplary embodiment, corresponding to one base station 200 attachment point, the wireless terminals using that attachment point, which are in split-tone format DCCH mode, transmit a transmission power backoff report using a second format, e.g., a 4 bit format, using preselected DCCH segments in a recurring transmission timing pattern being followed for the DCCH split-tone format.

In various embodiments, for a given wireless terminal the transmission power backoff reports are transmitted less frequently than the wireless terminal power commands. For example, in some embodiments, the rate of power control signaling from the base station to a wireless terminal is at least 20 times the rate of wireless terminal transmission power backoff report signaling from the wireless terminal to the base station. Thus, in some such embodiments, for a given wireless terminal, wireless terminal transmission power command module generates at least 20 times as many command signals as wireless terminal backoff report processing module 234 processes received transmission power backoff reports.

Wireless terminal identification information 262 includes base station assigned wireless terminal identifiers, e.g., active user identifiers and/or ON state identifiers. DCCH mode 264 identifies the wireless terminal DCCH mode of operation, e.g., a full-tone format DCCH mode in which the wireless terminal is allocated a logical DCCH tone to be used by the wireless terminal for uplink DCCH segments associated with the logical tone and a split-tone DCCH mode of operation in which the wireless terminal is assigned a logical DCCH channel tone associated with a subset of the DCCH segment associated with the logical tone to be used by the wireless terminal. In various embodiments, different wireless terminal transmission power backoff report formats and/or reporting locations in a recurring structure are followed as a function of the DCCH mode 264.

Base station attachment point information 266 includes information identifying the base station attachment point being used by wireless terminal 1, a base station attachment point corresponding to a combination of base station sector and downlink/uplink tone block pair. User/device/session/resource/information 268 includes, e.g., user identification information, user state information, device identification information, device state information, device control parameters, session state information, session state information, peer node information, addressing information, routing information, and resource information such as, e.g., downlink power control command segments allocated for WT 1 to use as a dedicated resource and uplink dedicated control channel segments allocated for WT 1 to use as a dedicated resource, at least some of the dedicated control channel segment being used to convey wireless terminal transmission power backoff reports.

User data 270 includes, e.g., voice data, image data, audio data, text data, file data, etc., corresponding to data communicated in uplink and/or downlink traffic channel segments. Target received power information 271 is, e.g., a current target received power level associated with the dedicated control channel, to which the base station is using in performing closed loop power control operations with regard to the dedicated control channel. In various embodiments, the dedicated control channel, for a given wireless terminal, e.g., WT 1, uses a single logical tone, and the single logical tone may be, and sometimes is, frequency hopped in accordance with uplink hopping information.

Received power measurement 1 272, ..., received power measurement N 274 are results obtained from the power measurement module 228 with respect to the dedicated control channel signal being received from wireless terminal 1 at different points in time.

Wireless terminal power control command tracking information 276 includes information included in individual commands to be sent to wireless terminal 1, cumulative information corresponding to successive commands sent to wireless terminal 1, timing information associated with the commands and information identifying resets, e.g., re-initialization and/or readjustment following the processing of a received backoff report.

Received backoff report 1 278 and received backoff report 2 280 include information corresponding to reports, e.g., successive, transmission power backoff reports communicated from wireless terminal 1. In various embodiments, a transmission power backoff report conveys an amount of remaining power that a wireless terminal has to use, e.g., in dBs, after taking into account the amount of power being used by the dedicated control channel.

In various embodiments, separate modules are used for different base station sectors and/or base station sector attachment points of base station 200. For example, in one exemplary embodiment, there is a separate base station transmitter/receiver pair corresponding to each of the sectors of the base station, with each sector using a separate antenna and/or separate elements of a sectorized antenna. In some embodiments, scheduling is performed on a per attachment point basis, with an attachment point following a recurring structure and having a set of dedicated control channel tones, e.g., 31 DCCH tones, to be allocated among different wireless terminals using the base station sector attachment point.

Figure 3:
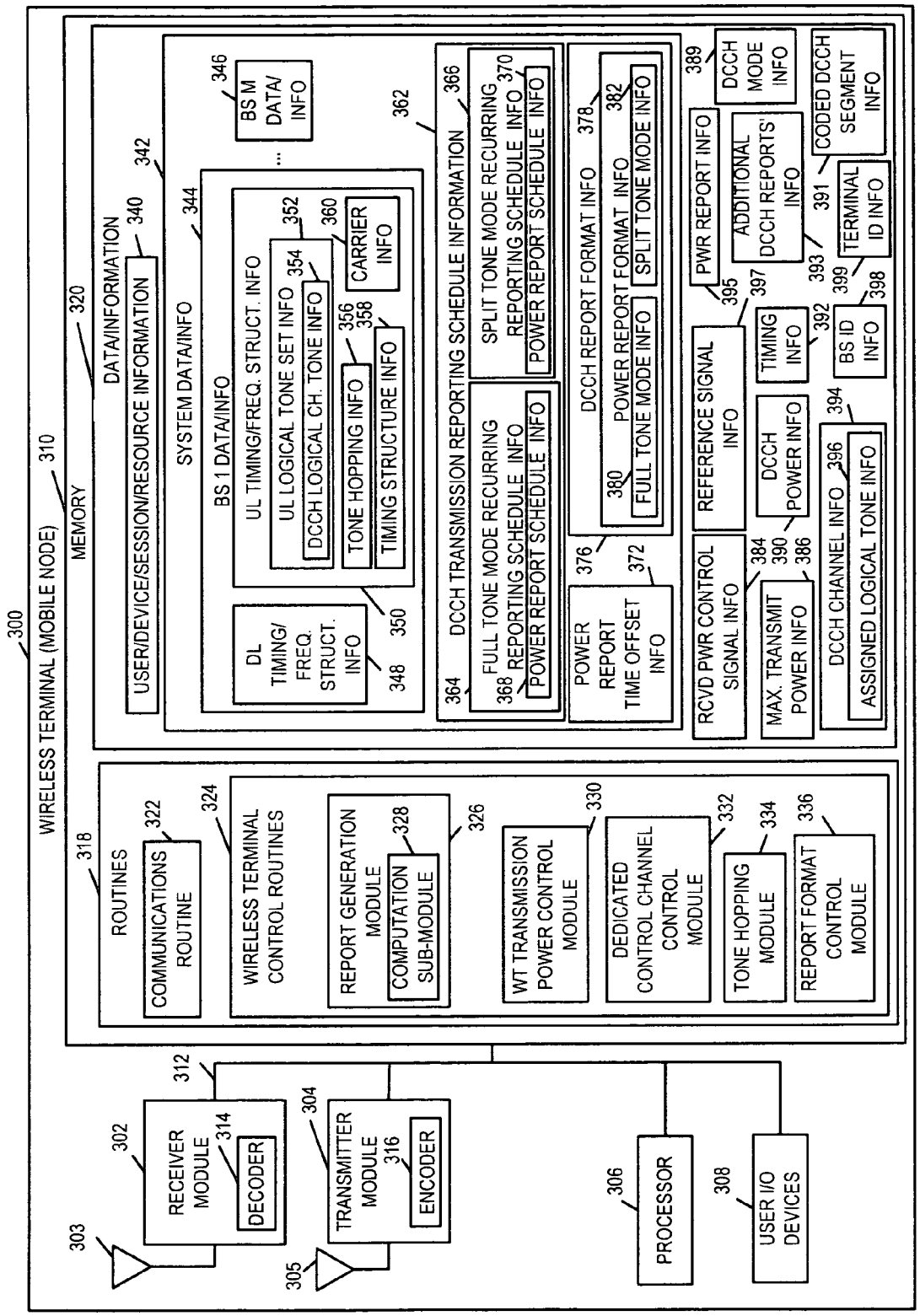
FIG. 3 is a drawing of an exemplary wireless terminal, e.g., mobile node, implemented in accordance with various embodiments.

FIG. 3 is a drawing of an exemplary wireless terminal 300, e.g., mobile node, implemented in accordance with various embodiments. Exemplary wireless terminal 300 may be any of the wireless terminals of FIG. 1. Exemplary wireless terminal 300 includes a receiver module 302, a transmitter module 304, a processor 306, user I/O devices 308, and memory 310 coupled together via a bus 312 over which the various elements interchange data and information.

Memory 310 includes routines 318 and data/information 320. The processor 306, e.g., a CPU, executes the routines 318 and uses the data/information 320 in memory 310 to control the operation of the wireless terminal 300 and implement methods. User I/O devices 308, e.g., microphone, keyboard, keypad, switches, camera, display, speaker, etc., are used to input user data, output user data, allow a user to control applications, and/or control various functions of the wireless terminal, e.g., initiate a communications session.

Receiver module 302, e.g., an OFDM receiver, is coupled to a receive antenna 303 via which the wireless terminal 300 receives downlink signals from base stations. Received downlink signals include, e.g., beacon signals, pilot signals, downlink traffic channel signals, power control signals including closed loop power control signals, timing control signals, assignment signals, registration response signals, and signals including base station assigned wireless terminal identifiers, e.g., an ON state identifier associated with a DCCH logical channel tone. Receiver module 302 includes a decoder 314 used to decode at least some of the received downlink signals.

Transmitter module 304, e.g., an OFDM transmitter, is coupled to a transmit antenna 305 via which the wireless terminal 300 transmits uplink signals to base stations. In some embodiments, the same antenna is used for receiver and transmitter, e.g., the antenna is coupled through a duplexer module to receiver module 302 and transmitter module 304. Uplink signals include, e.g., registration request signals, dedicated control channel segment signals, e.g., conveying a reference signal which can be measured by a base station and reports including WT power reports such as a WT transmission power backoff report, and uplink traffic channel segment signals. Transmitter module 304 includes an encoder 316 used to encode at least some of the uplink signals. DCCH segments, in this embodiment, are encoded on a per segment basis.

Routines 318 include a communications routine 322 and wireless terminal control routines 324. The communications routine 322 implements the various communications protocols used by the wireless terminal 300. Wireless terminal control routines 324 include a report generation module 326, a wireless terminal transmission power control module 330, a dedicated control channel control module 332, a tone hopping module 334, and a report format control module 336. Report generation module 326 includes a computation sub-module 328.

Report generation module 326 generates power reports, e.g., wireless terminal transmission power backoff reports, each power report indicating a ratio of a maximum transmit power of the wireless terminal to the transmit power of a reference signal having a power level known to the wireless terminal at a point in time corresponding to the power report. Wireless terminal transmission power control module 330 is used for controlling the wireless terminal's transmission power level based on information including at least one closed loop power level control signal received from a base station. The closed loop power control signal received from the base station may be a signal used to control the wireless terminal transmitter power so that a desired received power level is achieved at the base station. In some embodiments, the base station does not have actual knowledge of the wireless terminal's actual transmission power level and/or maximum transmit power level. In some system implementations different devices may have different maximum transmit power levels, e.g., a desk top wireless terminal may have a different maximum transmission power capability than a portable notebook computer implemented wireless terminal, e.g., operating off battery power.

Wireless terminal transmission power control module 330 performs closed loop power control adjustments of a transmission power level associated with the dedicated control channel. Dedicated control channel control module 332 determines which single logical tone in a plurality of logical tones is to be used for the dedicated control channel signaling, said single logical tone being dedicated to the wireless terminal for use in transmitting control signaling using a set of dedicated control channel segments.

Tone hopping module 334 determines at different points in time a single physical OFDM tone to be used to communicate dedicated control channel information during a plurality of consecutive OFDM symbol transmission time intervals. For example, in one exemplary embodiments, a dedicated control channel segment corresponding to a single dedicated control channel logical tone includes 21 OFDM tone-symbols, the 21 OFDM tone-symbols comprising three sets of 7 OFDM tone-symbols, each set of seven OFDM tone-symbols corresponding to a half-slot of seven consecutive OFDM symbol transmission time periods and corresponding to a physical OFDM tone, each of the three sets may correspond to a different physical OFDM tone with the OFDM tone for a set being determined in accordance with tone hopping information. Report format control module 336 controls the format of the power report as a function of which one of a plurality of dedicated control channel modes of operation is being used by the wireless terminal 300 at the time the report is transmitted. For example, in one exemplary embodiment, the wireless terminal uses a 5 bit format for the power report when in a full-tone DCCH mode of operation and uses a 4 bit power report when in a split-tone mode of operation.

Computation sub-module 328 subtracts a per-tone transmission power of an uplink dedicated control channel in dBm from a maximum transmission power of the wireless terminal in dBm. In some embodiments, the maximum transmission power is a set value, e.g., a predetermined value stored in the wireless terminal or a value communicated to the wireless terminal, e.g., from a base station, and stored in the wireless terminal. In some embodiments, the maximum transmission power depends on a power output capacity of the wireless terminal. In some embodiments, the maximum transmission power is dependent upon the type of wireless terminal. In some embodiments, the maximum transmission power is dependent upon a mode of operation of the wireless terminal, e.g., with different modes corresponding to at least two of the following: operation using an external power source, operation using a battery, operation using a battery having a first level of energy reserve, operation using a battery having a second level of energy reserve, operation using a battery with an expected amount of energy reserve to support a first duration of operational time, operation using a battery with an expected amount of energy reserve to support a second duration of operational time, operation in a normal power mode, operation in a power saving mode said maximum transmit power in the power saving mode being lower than said maximum transmit power in said normal power mode. In various embodiments, the maximum transmission power value is a value which has been selected to be in compliance with a government regulation limiting the maximum output power level of the wireless terminal, e.g., the maximum transmission power value is selected to be the maximum permissible level. Different devices may have different maximum power level capabilities which may or may not be known to a base station. The base station can, and in some embodiments does, use the backoff report in determining the supportable uplink traffic channel data throughput, e.g., per transmission segment throughput, which can be supported by the wireless terminal. This is because the backoff report provides information about the additional power which can be used for traffic channel transmissions even though the base station may not know the actual transmission power level being used or the maximum capability of the wireless terminal since the backoff report is provided in the form of a ratio.

In some embodiments the wireless terminal can support one or more wireless connections at the same time, each connection having a corresponding maximum transmission power level. The maximum transmission power levels, indicated by values, may be different for different connections. In addition, for a given connection the maximum transmission power level may vary over time, e.g., as the number of connections being supported by the wireless terminal varies. Thus, it may be noted that even if the base station knew the maximum transmission power capability of a wireless terminal, the base station may not be aware of the number of communications links being supported by the wireless terminal at a particular point in time. However, the backoff report provides information which informs the base station about the available power for a given connection without requiring the base station to know about other possible existing connections which may be consuming power resources.

Data/information 320 includes user/device/session/resource information 340, system data 342, received power control signal information 384, maximum transmission power information 386, DCCH power information 390, timing information 392, DCCH channel information 394, base station identification information 398, terminal identification information 399, power report information 395, additional DCCH reports' information 393, coded DCCH segment information 391, and DCCH mode information 389. DCCH channel information 394 includes assigned logical tone information 396, e.g., information identifying the single logical DCCH channel tone currently allocated to the wireless terminal by a base station attachment point.

User/device/session/resource information 340 includes user identification information, username information, user security information, device identification information, device type information, device control parameters, session information such as peer node information, security information, state information, peer node identification information, peer node addressing information, routing information, air link resource information such as uplink and/or downlink channel segments assigned to WT 300. Received power control information 384 includes received WT power control commands from a base station, e.g., to increase, decrease or do not change the transmission power level of the wireless terminal with respect to a control channel being closed loop power controlled, e.g., a DCCH channel. Maximum transmit power information 386 includes a maximum wireless terminal transmit power value to be used in generating a power report. Reference signal information 397 includes information identifying the reference signal to be used in the power report calculation, e.g., as the DCCH channel signal, and a transmit power level of the reference signal at a point in time, the point in time being determined based on the start transmit time of the DCCH segment in which the power report is communicated and power report time offset information 372. DCCH power information 390 is the result of computation sub-module 328 which uses the maximum transmit power information 386 and the reference signal info 397 as input. DCCH power information 390 is represented by a bit pattern in power report information 395 for communicating a power report. Additional DCCH reports' information 393 includes information corresponding to other types of DCCH reports, e.g., other DCCH reports such as a 1 bit uplink traffic channel request report or a 4 bit uplink traffic channel request report, which is communicated in the same DCCH segment as a power report. Coded DCCH segment information 391 includes information representing a coded DCCH segment, e.g., a DCCH segment conveying a power report and an additional report. Timing information 392 includes information identifying the timing of the reference signal information and information identifying the timing of the start of a DCCH segment to be used to communicate a power report. Timing information 392 includes information identifying the current timing, e.g., relating indexed OFDM symbol timing within an uplink timing and frequency structure to recurring DCCH reporting schedule information, e.g., to indexed DCCH segments. Timing information 392 is also used by the tone hopping module 344 to determine tone hopping. Base station identification information 398 includes information identifying the base station, base station sector, and/or base station tone block associated with a base station attachment point being used by the wireless terminal. Terminal identification information 399 includes wireless terminal identification information including base station assigned wireless terminal identifiers, e.g., a base station assigned wireless terminal ON state identifier to be associated with DCCH channel segments. DCCH channel information 394 includes information identifying the DCCH channel, e.g., as a full-tone channel or as one of a plurality of split tone channel. Assigned logical tone information 396 includes information identifying the logical DCCH tone to be used by the WT 300 for its DCCH channel, e.g., one DCCH logical tone from the set of tones identified by information 354, the identified tone corresponding to a base station assigned WT ON state identifier of terminal ID information 399. DCCH mode information 389 includes information identifying the current DCCH mode of operation, e.g., as a full-tone format mode of operation or a split-tone format mode of operation. In some embodiments, DCCH mode information 389 also includes information identifying different mode of operation corresponding to different values for the maximum transmit power information, e.g., a normal mode and a power saving mode.

System data/information 342 includes a plurality of sets of base station data/information (BS 1 data/information 344, BS M data/information 346), DCCH transmission reporting schedule information 362, power report time offset information 372 and DCCH report format information 376. BS 1 data/information 344 includes downlink timing/frequency structure information 348 and uplink timing/frequency structure information 350. Downlink timing/frequency structure information 348 includes information identifying downlink tone sets, e.g., a tone block of 113 tones, downlink channel segment structure, downlink tone hopping information, downlink carrier frequency information, and downlink timing information including OFDM symbol timing information and grouping of OFDM symbols, as well as timing information relating the downlink and uplink. Uplink timing/frequency structure information 350 includes uplink logical tone set information 352, tone hopping information 356, timing structure information 358, and carrier information 360. Uplink logical tone set information 352, e.g., information corresponding to a set of 113 uplink logical tones in an uplink channel structure being used by a base station attachment point, includes DCCH logical channel tone information 354, e.g., information corresponding to a subset of 31 logical tones used for the dedicated control channel with a wireless terminal in the ON state using the BS 1 attachment point receiving one of the 31 tones to use for its dedicated control channel segment signaling. Carrier information 360 includes information identifying the uplink carrier frequency corresponding to a base station 1 attachment point.

DCCH transmission reporting schedule information 362 includes DCCH full tone mode recurring reporting schedule information 364 and split-tone mode recurring reporting schedule information 366. Full tone mode recurring reporting schedule information 364 includes power report schedule information 368. Split tone mode recurring reporting schedule information 366 includes power report schedule information 370. DCCH report format information 376 includes power report format information 378. Power report format information 378 includes full-tone mode information 380 and split tone mode information 382.

DCCH transmission reporting scheduling information 362 is used in controlling the transmission of generated DCCH reports. Full tone mode recurring reporting scheduling information 364 is used in for controlling DCCH reports when the wireless terminal 300 is operating in a full-tone mode of DCCH operation. Drawing 1099 of FIG. 6 illustrates exemplary full-tone mode DCCCH recurring reporting schedule information 364. Exemplary power report schedule information 368 is information indicating that segment 1006 with index s2=6 and segment 1026 with index s2=26 are each used to convey a 5 bit wireless terminal uplink transmission power backoff report (ULTXBKF5). Drawing 3299 of FIG. 7 illustrates exemplary split-tone mode DCCCH recurring reporting schedule information 366. Exemplary power report schedule information 370 is information indicating that segment 3203 with index s2=3 and segment 3221 with index s2=21 are each used to convey a 4 bit wireless terminal uplink transmission power backoff report (ULTXBKF4).

DCCH report format information 376 indicates formats used for each of the DCCH reports, e.g., number of bits in a report, and the information associated with each of potential bit patterns that can be communicated with the report. Exemplary full-tone mode power report format information 380 includes information corresponding to Table 1100 of FIG. 8 illustrating the format of ULTxBKF5. Exemplary split-tone mode power report format information 382 includes information corresponding to Table 1200 of FIG. 9 illustrating the format of ULTxBKF4. Backoff Reports ULTxBKF5 and ULTxBKF4 indicate a dB value.

Power report time offset information 372 includes information indicating a time offset between the point in time to which a generated power report corresponds, e.g., provides information for, and a start of a communications segment in which said report is to be transmitted. For example, consider that a ULTxBKF5 report is to be communicated in an exemplary uplink segment corresponding to segment 1006 with index s2=6 of a beaconslot and consider that the reference signal used in generating the report is the dedicated control channel signal. In such a case, the time offset information 372 includes information indicating a time offset between the time to which the report information corresponds, e.g., the OFDM symbol transmission time interval prior to the transmission time of the report corresponding to the reference signal, e.g., DCCH signal, transmission power level and a start of the segment 1006 transmission.

FIG. 4 is a drawing set 600 illustrating exemplary signaling and wireless terminal power tracking in accordance with various embodiments. Time is represented by horizontal line 601. Drawing 602 illustrates exemplary power control signaling transmitted by the base station to a wireless terminal. An up arrow indicates that the power control signal commands the WT to increase the DCCH channel signal power by a predetermined factor, e.g., +1 dB, while a down arrow indicates that the power control signal commands the WT to decrease the DCCH channel signal power by the predetermined factor, e.g., −1 dB.

The WT is, e.g., a WT in the On state of operation using the base station as its current point of attachment and having a WT On identifier assigned from the base station and using dedicated control channel uplink segments corresponding to the assigned WT On identifier. Drawing 604 illustrates exemplary power availability reports, e.g., WT transmitter power backoff reports, transmitted from the wireless terminal to the base station using dedicated control channel segments. In this example, one power availability report is transmitted from wireless terminal to the base station for every 20 power availability signals transmitted from the base station to the wireless terminal. The power availability report communicates information such that the base station can determine the level of the WT DCCH channel power.

Drawing 606 illustrates the WT interpretation of received power control signals transmitted by the base station to the WT. The WT interpretation of received power control signals does not exactly match the transmitted signals of drawing 602. For example, interference noise may corrupt the signal and the intended value may not be recovered from the received signal. Drawing 608 identifies with an X where errors have occurred in the control signaling.

Drawing 610 illustrates the base stations estimated WT DCCH power, which combines the DCCH power level determined from a received power availability with the incremental power control signals which are transmitted by the base station to the WT. Drawing 612 illustrates the wireless terminal DCCH power which combines the DCCH power level associated with a power availability report with its interpretation of the received power control signals. It should be observed that the error in the recovery of a control signal results in a discrepancy between the WTs actual DCCH power level and the base station's estimated WT DCCH power. However, when the base station receives a new power availability report, e.g., power availability report R1, the base station is able to refreshes its estimate of the DCCH power to match the WT's actual level. For example, the base station receives power availability report R1 from which it determines a DCCH power level $R1_{1'}$ dBs which it compares to its estimate of DCCH power which is $(R_{1'}+8)$ dBs. It can be seen from the WT DCCH power drawing 612, that $(R_{1'}+6)$ dBs=$R1_{1'}$ dBs; therefore the base station recognizes that its estimate was off by +2 dBs.

Power control signaling in this exemplary embodiment can communicate the power control signal via one information bit. However, the backoff report utilizes more bits, e.g., 4 or 5 information bits. In some other embodiments, the backoff report may utilize a different number of information bits, e.g., 6 or 7 information bits. The base station expects and tolerates an error rate regarding the power control signaling. The wider the spacing between power availability reports, the less overhead used on average, but the larger the expected error rate is expected to be. The power availability reports are intentionally spaced such as to refresh the base station's estimate of the DCCH power level and keep the expected discrepancy within a tolerable range.

In some embodiments of the invention, an additional feature is added which serves to improve the base station's understanding and tracking of the WT DCCH power. If all the commands had been received correctly, then the base station can expect its estimate of DCCH power to match the DCCH power level extracted from the power availability report. However, if there is a mismatch, as shown in this example, then the base station can generate an estimate of the power adjustment signal and modify the estimated amount of power as a function of the estimated error rate. For example, in FIG. 4, after the base station receives report R1 and determines that there is a power discrepancy of 2 dB, the base station estimates an error rate of the power control signal, e.g., 1 transmission failure per 20 transmissions. The base station, can in its subsequent estimations of WT DCCH power level, use that information to modify its estimate. For example, the base station rescale each transmitted power control signal, in its estimate, to represent a change of +18/20 dBs or −18/20 dBs instead of a change of +1 dB or −1 dB.

Figure 5:
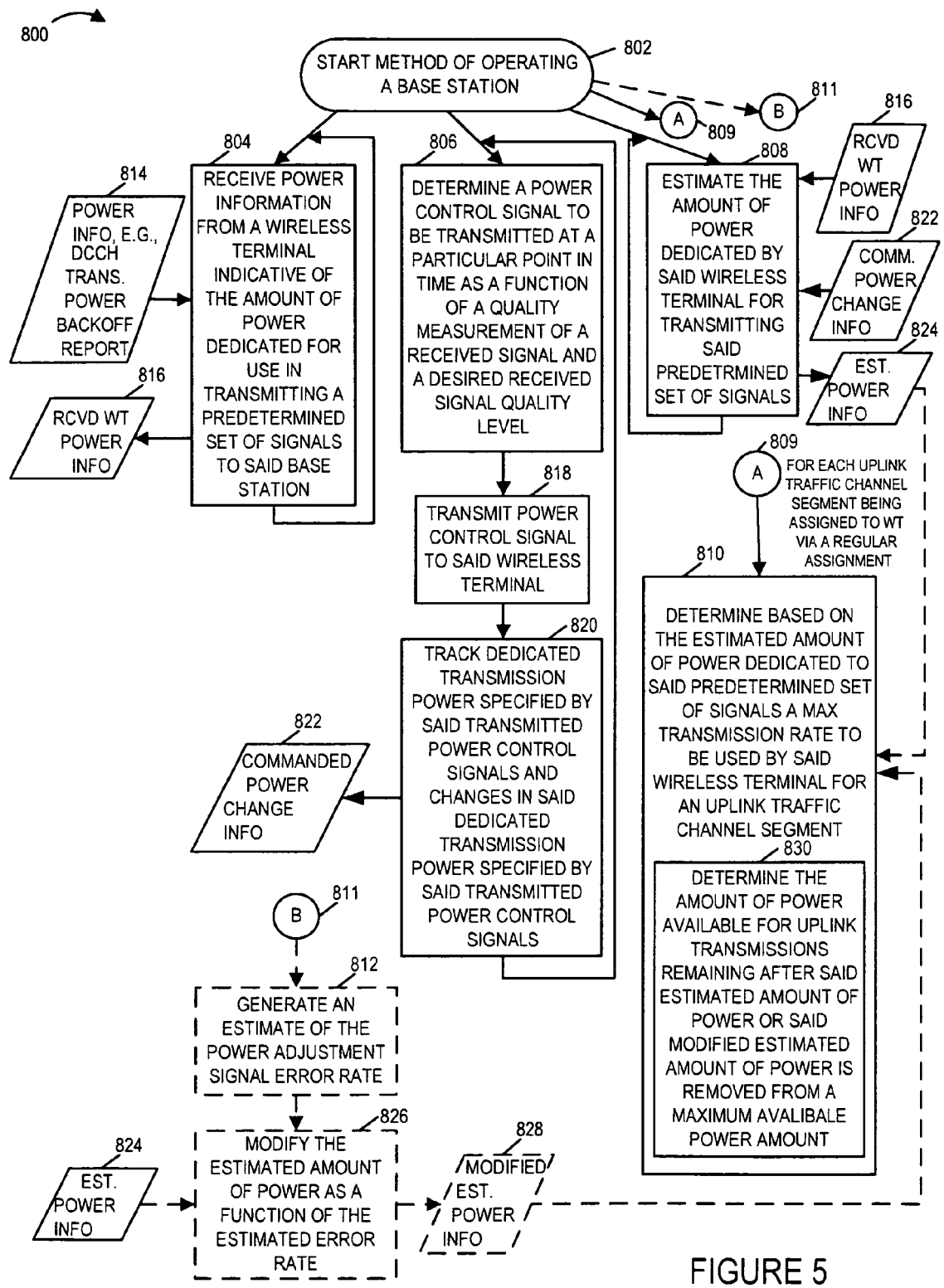
FIG. 5 is a flowchart of an exemplary method of operating a base in accordance with various embodiments.

FIG. 5 is a flowchart 800 of an exemplary method of operating a base in accordance with the present invention. Operation of the exemplary method starts in step 802, where the base station is powered on and initialized. Operations in step 802 include operating the base station to assign a wireless terminal On identifier to a wireless terminal using the base station as its current point of attachment, the wireless terminal On identifier being associated with a dedicated control sub-channel, e.g., a single logical tone, in the uplink timing and frequency structure being used by the base station. The wireless terminal uses the dedicated control sub-channel, to which it has been assigned, to send uplink channel reports to the base station, e.g., in accordance with a predetermined reporting schedule. Operation proceeds from step 802 to steps 804, 806, and step 808. Operation also proceeds from step 802 to step 810 via connecting node A 809. In some embodiments, operation proceeds from step 802 to step 812 via connecting node B 811.

In step 804 the base station receives power information from a wireless terminal indicative of the amount of power dedicated for use in transmitting a predetermined set of signals, e.g., a set of signals communicated using segments of the assigned dedicated control sub-channel. In some embodiments, the received power information indicates an amount of power dedicated for transmitting said predetermined set of signals during a single transmission period. In this example, in step 804, the base station receives a dedicated control channel (DCCH) transmission power backoff report 814 and outputs received wireless terminal power information 816. Step 804 is repeated on an ongoing basis, e.g., with the base station responding to each transmitted DCCH transmission power backoff report from the base station. In some embodiments, a transmission power backoff report for the wireless terminal is scheduled to be transmitted twice during each beaconslot. In some embodiments, a beaconslot has a duration of 912 OFDM symbol transmission time periods.

In step 806, the base station is operated to determine a power control signal to be transmitted at a particular point in time as a function of a quality measurement of a received signal and a desired signal quality level. Operation proceeds from step 806 to step 818, where the base station is operated to transmit power control signals to said wireless terminal over a wireless communications link. Operation proceeds from step 818 to step 820. In step 820 the wireless terminal is operated to track the dedicated transmission power specified by the transmitted power control signals and changes in the dedicated transmission power specified by said transmitted power control signals. Step 820 outputs commanded power change information 822. The operations of steps 806, 818, and 820 are repeated on a recurring basis. In some embodiments, the power information signals, e.g., DCCH transmission power backoff reports are received at a first rate and the power control signal of step 818 are sent at a second rate which is faster than said first rate. In some such embodiments, the second rate is at least 20 times faster than the first rate.

In step 808, the base station estimates the amount of power dedicated by the wireless terminal for transmitting said predetermined set of signals during the time period for transmitting the predetermined set of signals. The estimating of step 808 is performed using the received WT power information 816 and information indicating changes in the dedicated transmission power specified by the transmitted control signals, commanded power change information 822. Step 808 outputs estimated power information 824. In some embodiments, estimating the amount of power dedicated by said wireless terminal during said period of time for transmitting said predetermined set of signals includes using at least one of an uplink communications delay and a downlink communications delay. In some such embodiments, the uplink communications delay includes an uplink transmission delay and an uplink signal processing delay and the downlink communications delay includes a downlink transmission delay and downlink signal processing delay.

In some embodiments, operation proceeds from step 802 via connecting node B 811 to step 812. In step 812, the base station generates an estimate of the power adjustment signal error rate. Operation proceeds from step 812 to step 826. In step 826, the base station modifies the estimated amount of power 824 as a function of the estimated error rate, generating modified estimated power information 828. In some embodiments, the modifying of step 826 is a function of the power control signals transmitted during a time period preceding said modifying of the estimated amount of power.

Operation proceeds from step 802 to step 810 via connecting node A 809 for each uplink traffic channel segment being assigned to the wireless terminal via regular traffic channel assignment message. In step 810 the base station determines, based on the estimated amount of power dedicated to said predetermined set of signals, e.g., using estimated power info 824 and/or modified estimated power information 828, a maximum transmission rate to be used by the wireless terminal for an uplink traffic channel segment. Step 810 includes sub-step 830 in which the base station determines the amount of power available for uplink transmission remaining after said estimated amount of power or said modified estimated amount of power is removed from a maximum available power amount.

FIG. 10 is a drawing 1300 illustrating exemplary power control signaling between a base station and wireless terminal, e.g., mobile node, in accordance with various embodiments. FIG. 10 illustrates various features of some embodiments. Drawing 1300 includes drawing 1302 representing the base station perspective and drawing 1304 representing the wireless terminal perspective. Exemplary signal 1306 is a transmitted report from the wireless terminal to the base station conveying wireless terminal transmit power information P(n). The base station receives the wireless terminal's report of transmit power P(n) as represented by arrow 1308, after an uplink transmission and processing delay 1308. Exemplary signal 1312 is another transmission power report, e.g., the next subsequent transmission power report, from the wireless terminal to the base station. Exemplary signal 1314 is an exemplary power command signal (Pc) from the base station to the wireless terminal for the wireless terminal's control/reference channel. The wireless terminal receives the power command as indicated by arrow 1316 after a downlink transmission and processing delay 1318.

It should be observed that power control signals such as signal 1314 are, in some embodiments, transmitted at a higher rate than wireless terminal transmission power reports such as signal 1306. In various embodiments a base station's estimate of wireless terminal transmission power is a function of at least one of an uplink transmission delay, and uplink processing delay, a downlink transmission delay, and a downlink processing delay.

P(n)=power used by mobile station to transmit the control/reference channel at time n. The mobile transmits the instantaneous value of P(n) periodically to the base station. For example, the mobile transmits the value of P(n) every L time units to the base station, e.g., at times n=0,L,2L, . . . .

The mobile's transmitted value of P(n) is received by the base station with a delay of N time units, due to uplink transmission and processing delays.

$P_c(n)$=power control command for the mobile station's control/reference channel transmitted by the base station at time n. This power control command is received by the mobile station with a delay of M time units, due to downlink transmission and processing delays.

$\hat{P}_c(n)$=mobile station's estimate of $P_c(n)$.

Then, the base station's estimate P(n) of the mobile's transmit power at any time n=jL+N+k, where $0 \leq k < L$, and j=0, 1, . . . , is given by:

$$\hat{P}(n) = P(jL) + \sum_{i=0}^{i=k+T_0} P_c(n - T_1 - i) \qquad (0.1)$$

where $T_0$ and $T_1$ are some constants chosen by the base station. Note that $P(jL)$ is the latest value of mobile control/reference channel transmit power known to the base station. The remaining terms on the right side of (0.1) represent the base station's estimate of the adjustments the mobile station has made to the control/reference channel transmit power in response to the power control commands sent by the base station.

Suppose that the values of the delays N and M are known to the base station. Then, the base station can choose $T_0$ and $T_1$ so as to minimize the difference between P(n) and $\hat{P}(n)$. For example, the base station can set $T_0$=N−1 and $T_1$=M. In particular, if $\hat{P}_c(n) = P_c(n)$ for all n, i.e., all power control commands are received correctly by the mobile station, then the base station, through an appropriate choice of $T_0$ and $T_1$, can ensure that $\hat{P}(n)=P(n)$ for all n.

Next, suppose that there are some errors in the mobile station's estimate of the power control commands. Since the mobile station reports P(n) at n=0,L,2L, . . . , the base station can estimate the probability of these errors by comparing its estimate $\hat{P}(n)$ with P(n) at n=0,L,2L, . . . . The base station can use this estimate of the error to refine its estimate $\hat{P}(n)$. For example, suppose that the base station sends only two possible power control commands: one to increase the mobile's control/reference channel transmit power by x units, and the other to reduce the transmit power by x units. Then, the base station's estimate $\hat{P}(n)$ of the mobile's transmit power at any time n=jL+N+k, where 0≦k<L, and j=0, 1, . . . , is given by:

$$\hat{P}(n) = P(jL) + \sum_{i=0}^{i=k+T_0} [1 - 2p(n - T_1 - i)]P_c(n - T_1 - i), \qquad (0.2)$$

where p(t), t=0, 1, 2, . . . , equals the base station's estimate of the probability of error in the mobile station's interpretation of the power control command $P_c(t)$.

The techniques of various embodiments may be implemented using software, hardware and/or a combination of software and hardware. Various embodiments are directed to apparatus, e.g., mobile nodes such as mobile terminals, base stations, communications system which implement the present invention. Various embodiments are also directed to methods, e.g., method of controlling and/or operating mobile nodes, base stations and/or communications systems, e.g., hosts. Some embodiments are directed to machine readable medium, e.g., ROM, RAM, CDs, hard discs, etc., which include machine readable instructions for controlling a machine to implement one or more steps of a method.

In various embodiments nodes described herein are implemented using one or more modules to perform the steps corresponding to one or more methods, for example, signal processing, message generation and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, the present invention is directed to a machine-readable medium including machine executable instructions for causing a machine, e.g., processor and associated hardware, to perform one or more of the steps of the above-described method(s).

While described in the context of an OFDM system, at least some of the methods and apparatus of various embodiments, are applicable to a wide range of communications systems including many non-OFDM and/or non-cellular systems.

Numerous additional variations on the methods and apparatus of various embodiments described above will be apparent to those skilled in the art in view of the above description. Such variations are to be considered within scope. The methods and apparatus of various embodiments may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods.

What is claimed is:

1. A method of operating a base station, the method comprising:
   receiving a report communicating transmission power information from said wireless terminal indicative of an amount of power dedicated for use in transmitting the predetermined set of signals to said base station;
   transmitting power control signals to said a wireless terminal over a period of time;
   estimating, based on the transmitted power control signals, an amount of power dedicated by said wireless terminal for transmitting a predetermined set of signals,
   wherein estimating the amount of power dedicated by said wireless terminal for transmitting on said predetermined set of signals is also based on tie report communicating transmission power information; and
   determining based on the estimated amount of power dedicated by said wireless terminal for transmitting said predetermined set of signals, an amount of remaining power available at said wireless terminal for other uplink transmissions.

2. The method of claim 1, wherein said report communicating transmission power information indicates a ratio of a maximum transmit power of the wireless terminal to a transmit power of a reference signal.

3. The method of claim 2, wherein said estimating is performed using said received power information, said received power information corresponding to a point in time, and information indicating changes in said dedicated transmission power specified by said transmitted control signals.

4. The method of claim 3, wherein said power information indicates an amount of power dedicated for transmitting said predetermined set of signals during a single transmission time period.

5. The method of claim 1, wherein reports communicating transmission power information are received at a first rate and wherein said power control signals are sent at a second rate which is faster than said first rate.

6. The method of claim 1, further comprising:
determining, based on the amount of remaining power available at said wireless terminal for other uplink transmissions at least one of a maximum transmission rate and a maximum transmission power to be used by said wireless terminal for at least some uplink traffic.

7. The method of claim 6, further comprising:
generating an estimate of the power adjustment signal error rate; and
modifying the estimated amount of power as a function of the estimated error rate.

8. The method of claim 7, wherein said modifying is a function of the power control signals transmitted during a time period preceding said modifying of the estimated amount of power.

9. The method of claim 1, further comprising:
determining the power control signal to be transmitted at a particular point in time as a function of a quality measurement of a received signal and a desired received signal quality level.

10. The method of claim 1, wherein said predetermined set of signals correspond to a control channel, said report communicating transmission power information indicating the transmission power used on the said control channel.

11. The method of claim 1, wherein determining said amount of remaining power available at said wireless terminal includes determining the amount of power available at said wireless terminal for uplink transmissions remaining after said estimated amount of power is removed from a maximum available uplink power amount.

12. The method of claim 1, wherein estimating the amount of power dedicated by said wireless terminal during said period of time for transmitting said predetermined set of signals includes using at least one of an uplink communication delay and a downlink communication delay.

13. The method of claim 12, wherein said uplink communication delay includes an uplink transmission delay and uplink signal processing delay and wherein said downlink communication delay includes a downlink transmission delay and downlink signal processing delay.

14. A base station comprising:
a receiver module for receiving a report communicating transmission power information from said wireless terminal indicative of an amount of power dedicated for use in transmitting the predetermined set of signals to said base station;
a transmitter for transmitting power control signals to a wireless terminal over a period of time; and
an estimation module for estimating, based on the transmitted power control signals, an amount of power dedicated by said wireless terminal for transmitting a predetermined set of signals,
wherein estimating the amount of power dedicated by said wireless terminal for transmitting on said predetermined set of signals is also based on the report communicating transmission power information; and
a determination module for determining, based on the estimated amount of power dedicated by said wireless terminal for transmitting said predetermined set of signals, an amount of remaining power available at said wireless terminal for other uplink transmissions.

15. The base station of claim 14, wherein said report communicating transmission power information indicates a ratio of a maximum transmit power of the wireless terminal to a transmit power of a reference signal.

16. The base station of claim 15, wherein said estimating is performed by said estimation module using said received power information, said received power information corresponding to a point in time, and information indicating changes in said dedicated transmission power specified by said transmitted control signals.

17. The base station of claim 16, wherein said power information indicates an amount of power dedicated for transmitting said predetermined set of signals during a single transmission time period.

18. The base station of claim 14 wherein reports communicating transmission power information are received at a first rate and wherein said power control signals are sent at a second rate which is faster than said first rate.

19. The base station of claim 14, wherein said determination module is further configured to determine, based on the amount of remaining power available at said wireless terminal for other uplink transmissions, at least one of maximum transmission rate and a maximum transmission power to be used by said wireless terminal for at least some uplink traffic.

20. The base station of claim 19, wherein said predetermined set of signals correspond to a control channel, said report communicating transmission power information indicating the transmission power used on the said control channel.

21. The base station of claim 19, further comprising:
an error estimation module for generating an estimate of the power adjustment signal error rate; and
an adjustment module for modifying the estimated amount of power as a function of the estimated error rate.

22. The base station of claim 21, wherein said adjustment module modifies the estimated amount of power as a function of the power control signals transmitted during a time period preceding said modifying of the estimated amount of power.

23. The base station of claim 14, further comprising:
a power control signaling module for determining the power control signal to be transmitted at a particular point in time as a function of a quality measurement of a received signal and a desired received signal quality level.

24. The base station of claim 14 wherein the determination module determines the amount of remaining power available at said wireless terminal by removing said estimated amount of power from a maximum available uplink power amount.

25. The base station of claim 14, further comprising:
a communication delay determination module for determining at least one of an uplink communications delay and a downlink communications delay.

26. The base station of claim 25, wherein the estimation module estimates the amount of power dedicated by said wireless terminal during said period of time for transmitting said predetermined set of signals using at least one of an uplink communication delay and a downlink communication delay.

27. The base station of claim 26, wherein said uplink communication delay includes an uplink transmission delay and uplink signal processing delay and wherein said downlink communication delay includes a downlink transmission delay and downlink signal processing delay.

28. A base station comprising:
means for receiving a report communicating transmission power information from said wireless terminal indicative of an amount of power dedicated for use in transmitting a predetermined set of signals to said base station;
means for transmitting power control signals to a wireless terminal over a period of time; and means for estimating, based on the transmitted power control signals, an amount of power dedicated by said wireless terminal for transmitting a predetermined set of signals, wherein said means for estimating the amount of power dedicated by said wireless terminal for transmitting said predetermined set of signals, estimates said amount of power also based on the report communicating transmission power information; and means for determining based on the estimated amount of power dedicated by said wireless terminal for transmitting said predetermined set of signals, an amount of remaining power available at said wireless terminal for other uplink transmissions.

29. The base station of claim 28, wherein said report communicating transmission power information indicates a ratio of a maximum transmit power of the wireless terminal to a transmit power of a reference signal.

30. The base station of claim 29, wherein said estimating is performed using said received power information, said received power information corresponding to a point in time, and information indicating changes in said dedicated transmission power specified by said transmitted control signals.

31. The base station of claim 30, wherein said power information indicates an amount of power dedicated for transmitting said predetermined set of signals during a single transmission time period.

32. The base station of claim 28, wherein communicating transmission power information are received at a first rate and wherein said power control signals are sent at a second rate which is faster than said first rate.

33. The base station of claim 28,
wherein said means for determining include means for determining at least one of a maximum transmission rate and a maximum transmission power to be used by said wireless terminal for at least some uplink traffic, based on the amount of remaining power available at said wireless terminal for other uplink transmissions.

34. The base station of claim 33, wherein said predetermined set of signals correspond to a control channel, said report communicating transmission power information indicating the transmission power used on the said control channel.

35. The base station of claim 33, further comprising:
means for generating an estimate of the power adjustment signal error rate; and
means for modifying the estimated amount of power as a function of the estimated error rate.

36. The base station of claim 35, wherein said means for modifying the estimated amount of power modifies the estimated amount of power as a function of the power control signals transmitted during a time period preceding said modifying of the estimated amount of power.

37. The base station of claim 28, further comprising:
means for determining the power control signal to be transmitted at a particular point in time as a function of a quality measurement of a received signal and a desired received signal quality level.

38. The base station of claim 28, wherein the means for determining an amount of remaining power available at said wireless terminal determines the amount of power available at said wireless terminal for uplink transmissions remaining after said estimated amount of power is removed from a maximum available uplink power amount.

39. The base station of claim 28, further comprising:
means for determining at least one of an uplink communications delay and a downlink communications delay.

40. The base station of claim 39, wherein the means for estimating estimates the amount of power dedicated by said wireless terminal during said period of time for transmitting said predetermined set of signals using at least one of an uplink communication delay and a downlink communication delay.

41. The base station of claim 40, wherein said uplink communication delay includes an uplink transmission delay and uplink signal processing delay and wherein said downlink communication delay includes a downlink transmission delay and downlink signal processing delay.

42. A non-transitory machine readable medium including machine executable instructions stored therein for implementing a method of operating a base station, the method comprising:
receiving a report communicating transmission power information from said wireless terminal indicative of an amount of power dedicated for use in transmitting the predetermined set of signals to said base station;
transmitting power control signals to a wireless terminal over a period of time;
estimating, based on the transmitted power control signals, an amount of power dedicated by said wireless terminal for transmitting a predetermined set of signals,
wherein estimating the amount of power dedicated by said wireless terminal for transmitting on said predetermined set of signals is also based on the report communicating transmission power information; and
determining based on the estimated amount of power dedicated by said wireless terminal for transmitting said predetermined set of signals, an amount of remaining power available at said wireless terminal for other uplink transmissions.

43. The non-transitory machine readable medium of claim 42, wherein said report communicating transmission power information indicates a ratio of a maximum transmit power of the wireless terminal to a transmit power of a reference signal.

44. The non-transitory machine readable medium of claim 43, wherein said estimating is performed using said received power information, said received power information corresponding to a point in time, and information indicating changes in said dedicated transmission power specified by said transmitted control signals.

45. The non-transitory machine readable medium of claim 44, wherein said power information indicates an amount of power dedicated for transmitting said predetermined set of signals during a single transmission time period.

46. The non-transitory machine readable medium of claim 42, wherein reports communicating transmission power information are received at a first rate and wherein said power control signals are sent at a second rate which is faster than said first rate.

47. The non-transitory machine readable medium of claim 42, further embodying machine executable instructions for:
determining, based on the amount of remaining power available at said wireless terminal for other uplink transmissions, at least one of a maximum transmission rate and a maximum transmission power to be used by said wireless terminal for at least some uplink traffic.

48. The non-transitory machine readable medium of claim 42, further embodying machine executable instructions for:
determining the power control signal to be transmitted at a particular point in time as a function of a quality measurement of a received signal and a desired received signal quality level.

49. The non-transitory machine readable medium of claim 42 wherein said predetermined set of signals correspond to a control channel, said report communicating transmission power information indicating the transmission power used on the said control channel.

50. The non-transitory machine readable medium of claim 42, where said machine executable instructions for determining said amount of remaining power include machine executable instructions for:
 determining said amount of remaining power by removing said estimated amount of power dedicated by said wireless terminal from a maximum available uplink power amount.

51. The non-transitory machine readable medium of claim 42, further embodying machine executable instructions for:
 generating an estimate of the power adjustment signal error rate; and
 modifying the estimated amount of power as a function of the estimated power adjustment signal error rate.

52. The non-transitory machine readable medium of claim 51, wherein said modifying is a function of the power control signals transmitted during a time period preceding said modifying of the estimated amount of power.

53. An apparatus operable in a communication system, the apparatus comprising:
 a processor configured to:
  receive a report communicating transmission power information from said wireless terminal indicative of an amount of power dedicated for use in transmitting the predetermined set of signals to said base station;
  transmit power control signals to a wireless terminal over a period of time; estimate, based on the transmitted power control signals, an amount of power dedicated by said wireless terminal for transmitting a predetermined set of signals,
  wherein said processor is configured to estimate the amount of power dedicated by said wireless terminal for transmitting on said predetermined set of signals also based on the report communicating transmission power information; and
  determine based on the estimated amount of power dedicated by said wireless terminal for transmitting said predetermined set of signals, an amount of remaining power available at said wireless terminal for other uplink transmissions.

54. The apparatus of claim 53, wherein the processor is configured to:
 remove said estimated amount of power form a maximum available uplink power amount as part of determining said amount of remaining power available at said wireless terminal.

* * * * *